United States Patent [19]

Fujimura et al.

[11] Patent Number: 4,751,532

[45] Date of Patent: Jun. 14, 1988

[54] THERMAL ELECTROSTATIC INK-JET RECORDING HEAD

[75] Inventors: Yoshihiko Fujimura; Koichi Saito; Eiichi Akutsu; Nanao Inoue; Kiyoshi Horie, all of Kanagawa, Japan

[73] Assignee: Fuji Xerox Co., Ltd., Tokyo, Japan

[21] Appl. No.: 42,305

[22] Filed: Apr. 24, 1987

[30] Foreign Application Priority Data

Apr. 25, 1986 [JP] Japan .................................. 61-94707

[51] Int. Cl.4 ............................................ G01D 15/16

[52] U.S. Cl. ................................ 346/140 R; 346/1.1; 346/75; 400/126

[58] Field of Search .................. 346/1.1, 75, 140 PD, 346/140 R, 139 R, 153.1, 155, 159; 400/126

[56] References Cited

FOREIGN PATENT DOCUMENTS 0153660 9/1983 Japan .................................... 346/75
0090775 5/1985 Japan ........................... 346/140 PD
0131251 7/1985 Japan ........................... 346/140 PD

*Primary Examiner*—Joseph W. Hartary
*Assistant Examiner*—Huan H. Tran
*Attorney, Agent, or Firm*—Finnegan, Henderson Farabow, Garrett and Dunner

[57] ABSTRACT

An ink-jet recording head wherein thermal energy and an electroelastic field are applied to ink held between two plate members to cause the ink to be jetted out from an orifice defined by the plate members wherein there is provided, on the orifice-side end portion of each of the plate members adjacent the orifice, a first area readily wettable by the ink and a second area away from the orifice which is less wettable by the ink.

13 Claims, 3 Drawing Sheets

THERMAL ELECTROSTATIC INK-JET RECORDING HEAD

FIELD OF THE INVENTION

The present invention relates to a thermal electrostatic ink-jet recording head, particularly a recording head used in a thermal electrostatic ink-jet recording apparatus in which an image is formed on paper with ink selectively jetted from the recording head by the cooperative action of thermal energy and an electrostatic field.

BACKGROUND OF THE INVENTION

Non-impact recording methods are becoming popular for making a hard copy image of electronic information due to the fact that less noise is produced in recording compared to impact recording. Also, ordinary paper can be used for recording without the need for any special treatment, such as photographic fixing.

In one ink-jet method which has been put into commercial use, a pressure pulse is applied to the ink during recording to jet the ink from an orifice in the recording head. However, a small-sized ink jet recording device cannot be used for such method. Further, in order to perform printing with the necessary ink density, mechanical scanning has been required for the ink-jet device. As a result, in such conventional ink-jet method, high-speed ink-jetting has not been attainable.

Recently, several techniques have been proposed to eliminate the aforementioned defects and make high-speed ink-jetting possible. In one proposed technique, a magnetic field is applied to magnetic ink positioned in the vicinity of a magnetic electrode array to produce a meniscus on the surface of the maqnetic ink. There is produced an ink jetting condition corresponding to a desired ink density, and an electrostatic field is applied to the magnetic ink to cause the magnetic ink to jet from the recording head. Although the magnetic ink-jet method has an advantage in that higher-speed recording can be performed using electronic scanning, the method has a disadvantage in that color imaging becomes difficult because of the effect of the color of the magnetic material in the ink.

In another proposed technique, the plane ink-jet method, ink is disposed in a slit-like ink reservoir parallel to an electrode array and is caused to jet out in accordance with an electric field pattern formed between an electrode array and an electrode opposite to the electrode array, with recording paper interposed therebetween. Although the plane ink-jet method has an advantage in that a small orifice is not required and, therefore, the problem of ink clogging of the orifice is avoided, the method has a disadvantage in that a high voltage is required for making the ink jet. In the method, it is necessary to perform time-division driving of the electrode array in order to prevent voltage leakage between adjacent electrodes. As a result, in the plane ink-jet method, high-speed ink jetting cannot be carried out satisfactorily.

Further, a so-called thermal bubble jet method has been proposed. Thermal energy is used to jet ink from an orifice. In the thermal bubble jet method ink is rapidly heated to produce surface boiling in the ink so as to rapidly form bubbles within an orifice and the ink is jetted out due to the increase of pressure within the orifice. In this method, it is required to rapidly raise the temperature of a heating element to produce surface boiling. Accordingly, the method has a practical disadvantage in that thermal transmutation of ink occurs and thermal degradation of the protective layer on the heating elements often occurs.

Prior to the present invention, the present inventor has proposed a novel high-speed, ink-jet method in which the most important defect in the conventional ink-jet method, that is, the low speed, is improved and in which the defects in the high-speed ink jet methods described above are avoided. This novel high-speed ink-jet method is called the thermal electrostatic ink jet method, in which thermal energy is applied to ink while simultaneously or successively applying an electrostatic field to the ink to cause the ink to be jetted.

The thermal electrostatic ink-jet recording head used in such a thermal electrostatic ink-jet method comprises heating elements for applying thermal energy to the ink, an electrostatic induction electrode applying an electrostatic field to the ink, and means for feeding to and holding the ink in an ink orifice to facilitate jetting of the ink.

More particularly, the proposed recording head comprises a first plate member formed of an insulating substrate having an array of heating resistors formed thereon and composed of a plurality of heating resistors disposed at predetermined intervals, a second plate member formed of an insulating substrate and disposed opposite to the first plate member at a predetermined distance apart, a slit-like opening formed betweeen the first and second plate members, a means, including a pump or the like, for feeding ink to and holding ink in the slit-like space, and an electrostatic induction electrode disposed on one of the plate members to apply an electrostatic field to the ink.

As the result of a further study of the aforementioned recording head proposed by the inventor, the inventor found that the wetability, by the ink at the ink orifice, of the surfaces of the first and second plate members adjacent the slit greatly controls the form, the maintenance, and the stability of the ink meniscus at the ink orifice and exerts a great influence on the ability to provide a stable, uniform recording operation.

SUMMARY OF THE INVENTION

It is an object of the present invention to provide an improved thermal electrostatic ink-jet recording head capable of more stable and uniform recording operations.

It is another object of the present invention to provide a thermal electrostatic ink-jet recording head which can perform high quality printing by providing a stable meniscus of necessary shape by controlling the surface condition of the recording head with respect to ink at the ink orifice, while maintaining stability of operation over a long period of time.

These and other objects are accomplished, in accordance with the present invention, by a thermal electrostatic ink-jet recording head comprising two opposing insulating plate members spaced apart a predetermined distance to provide a slit therebetween for holding an ink material, each of the plate members having an inner wall and an orifice-side end portion, the surfaces of the respective inner walls and end portions intersecting to define an ink-jet orifice, means on one of the inner walls for selectively heating the ink material, means on one of the inner walls for applying an electrostatic field to said ink material, a first area of the orifice-side end portions beyond a predetermined distance from the ink-jet orifice having a lower critical surface tension and a second area within the predetermined distance and adjacent the ink-jet orifice having a higher critical surface tension.

According to another aspect of the present invention, the whole surface of the ink-jet, orifice-side end portion of each of the insulating plates is subjected to a low surface energy treatment and a corner portion of the orifice-side end portion at an edge of the slit is beveled, or cut off, so that a higher surface energy area remains adjacent the slit.

A meniscus structure of ink material is formed at the ink orifice in an end portion of the slit. Thermal energy is selectively, locally applied to the ink material to heat a portion of the ink material corresponding to an image signal, and, simultaneously or successively, an electrostatic field induced by the electrostatic field induction means is applied to the ink material to selectively cause the heated part of the ink material to be jetted from the recording head. Thus, an image picture is formed on the recording medium.

According to the present invention, because an area of the insulating plates or substrates beyond a predetermined distance from an edge of the slit at an ink-jet orifice side, is subject to low surface energy treatment, ink does not readily wet the low surface energy treated area. Accordingly, the ink meniscus is stably maintained in the orifice in a hemispherical shape without undue influence of vibration, and the like on the liquid surface during printing.

BRIEF DESCRIPTION OF THE DRAWINGS

The manner by which the above and other objects, features, and advantages of the present invention are achieved and the contruction and operation of the present invention will be fully apparent upon reading the following detailed description thereof with reference to the accompanying drawings, in which.

DETAILED DESCRIPTION

Figure 1:
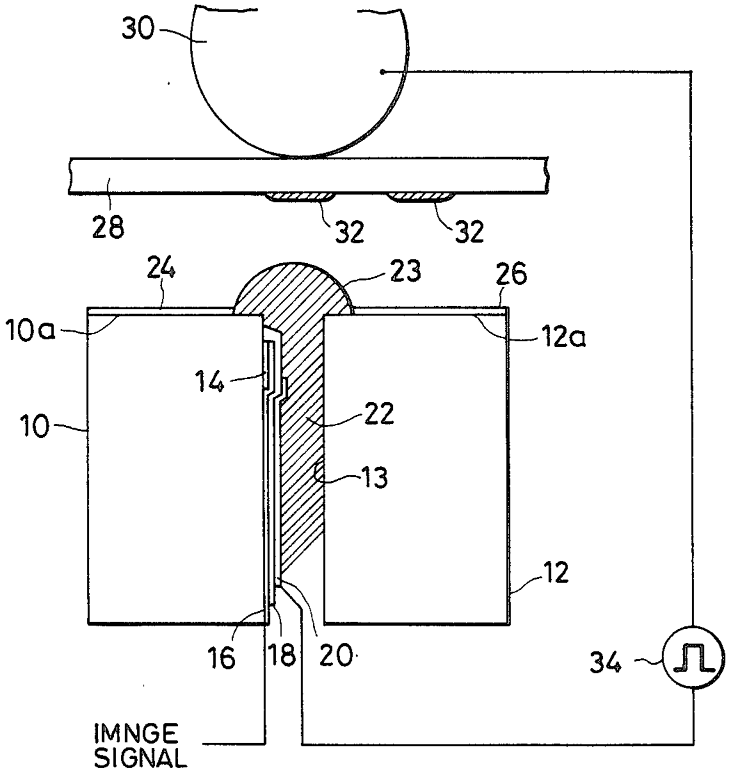
FIG. 1 is a sectional view of a first embodiment of the thermal electrostatic ink-jet recording apparatus according to the present invention.

Referring to FIG. 1, there is shown a sectional view of a first embodiment of the recording head of the present invention. A first plate member 10 and a second plate member 12, each comprised of an insulating substrate made of, for example, alumina or the like, are disposed at a predetermined distance apart from each other to form a slit 13 therebetween. The intersecting surfaces of the inner walls of the plate members and the surfaces of end portions 24 and 26 of the plate members define the orifice from which the ink is jetted. An array of heating elements 14, composed of a plurality of electric resistance heaters disposed apart at equal intervals along the length of the plate member, is provided on an inner wall surface of the first plate member 10. Each of the electric resistors 14, acting as an element of the resistor array, is connected to an electrically conducting electrode 16. Electric pulses corresponding to image signals are applied to the respective electric resistors through the electrode 16 from an electric power source (not shown). An insulating layer 18 is laminated on the electrode 16 and, further, an electrically conductive layer 20, typically a metallic material, serving as an electrostatic induction electrode is laminated on the surface of insulating layer 18.

Ink 22 is fed by ink feeding means (not shown) into the slit 13 formed by the first and second plate members 10 and 12. It is desired that the ink 22 forms a substantially convex, or hemispherical, meniscus 23 at a top end portion of the slit 13 which serves as an ink-jet orifice Upper end surfaces 10*a* and 12*a* of the first and second plate members 10 and 12, respectively, are treated as hereinafter described to reduce the inter-facial tension between the ink and the treated surfaces. The treated surfaces 24 and 26 extend on the end surfaces 10*a* and 12*a* of the plate members 10 and 12 from the outside edges thereof to within a predetermined distance from the edge of the ink-jet orifice where the meniscus 23 is shaped. A counter electrode 30 is provided opposite the meniscus of the ink behind a recording medium 28, such as recording paper or the like. The reference numeral 32 designates a printed dot formed on the recording medium 28.

The desired shape of the meniscus 23 is maintained, e.g., convex, by a result of the interfacial tension between the ink 22 and the low surface energy treated layers 24 and 26 relative to the interfacial tension between the ink and the non-treated areas of upper end surfaces 10*a* and 12*a* of the plate members 10 and 12. More particularly, because ink has a property of not as readily wetting the treated layers 24 and 26 but more readily wetting the non-treated surfaces of the plate members, the stable shape of the meniscus can be maintained without undue influence of vibration and the like on the liquid surface during printing. In the thermal electrostatic ink jet recording method, the shape of the meniscus greatly influences printing quality. For example, improper outflow of ink from the meniscus and transmutation of the meniscus cause reduction in printing quality, as a consequence of too much dotting or too little dotting.

To maintain the desired shape of the meniscus so as to provide good printing quality, it is preferable to satisfy the condition:

$$\gamma c_1 < \gamma c_3 < \gamma c_2$$

where 65 $c_1$, $\gamma c_2$, and $\gamma c_3$ represent the critical surface tensions of the treated surface area of the plate member, the non-treated surface area of the plate members 10 and 12, and the ink material, respectively. Accordingly, an interface between portions, having different surface tensions is stabilized because one of the forces, i.e., $\gamma c_1$ acts to repel ink and the other, i.e., $\gamma c_2$ acts to be wet with ink. As the result, the ink meniscus is stabilized at the interface between surfaces of the plate having different surface tensions. Generally, the critical surface tension of ink is about 20 to 40 dyne/cm. Accordingly, the foregoing condition for critical surface tensions can be satisfied when the surface-treated layers 24 and 26 are a silicone-type or fluorocarbon-type resin and the surfaces 10*a* and 12*a* of the plate members are a material, such as $SiO_2$, $Al_2O_3$, a metal or the like.

An advantage is that the distance between the inside edge of the slit 13 and the the edges of the surface-treated areas 24 and 26 extending away from the slit can be easily set to form any desired meniscus, and that the meniscus thus formed can be stably maintained to facilitate the production of the recording head.

An example of a method for the production of the thermal electrostatic ink-jet recording head according to this embodiment is illustrated as follows.

A first insulating plate member 10 having a heating element array 14, a current conducting electrode 16, an insulating layer 18, and an electrostatic induction electrode layer 20 formed thereon, is disposed opposite to a second insulating plate member 12 at a predetermined distance through use of a spacer of the desired thickness. The two plate members 10 and 12 are joined to the spacer with an adhesive agent to form a slit 13 therebetween. Ink-dot side (orifice egress side) end surfaces 10*a* and 12*a* of the respective plate members 10 and 12 are finished by polishing, cutting or the like, whereafter each of the end surfaces is coated with a photo-resist material, mask-exposured and developed to form a mask in a conventional manner. After the mask formation, each respective end surface is further coated with a surface treating agent, for example, by plasma CVD, to form a low surface energy films 24 and 26 thereon. The mask is removed by etching, so patterned low surface energy films 24 and 26 remain on the desired areas of the upper end surfaces 10*a* and 12*a* of the plate members 10 and 12, and extend from beyond a predetermined distance from the ink-jet orifice and an area more wetable by the ink is provided within the predetermined distance adjacent the orifice 13.

Using the above method, patterning of the low surface energy film can be easily made with high precision. Precision machining as is required for a conventional edge-like, ink-jet nozzle is not necessary. Because a stable meniscus having the desired shape can be formed with high precision, a thermal electrostatic ink-jet recording head capable of maintaining stable printing quality can be produced relatively easily.

The operation of the aforementioned recording head according to the first embodiment of the invention is described in detail as follows:

Pulse electric energy of 0.2 to 2.0 W is applied through the current conducting electrode 16 to a part of the resistance heater array 14, corresponding to an image signal, to raise the temperature of the resistors receiving the image signal so that a part of the ink 22 corresponding to the image signal is instantaneously heated to about 200° C. to change its physical properties, such as viscosity, surface tension, electrical conductivity and the like. At the same time, a high-voltage pulse of 1.0 to 3.0 kV is applied across the electrostatic induction electrode 20 and the counter electrode 30 to jet the heated part of the ink material toward the recording medium 28. Thus, printing dots 32 can be formed on the recording medium 28.

Although this embodiment has been described wherein the application of thermal energy is made by the heating resistor array 14 simultaneously with the electrostatic field application across the electrostatic induction electrode 20 and the counter electrode 30, it is not necessary that the two applications be made simultaneously. For example, the two forms of energy may be applied under timing control, or the electrostatic field application may be made continuously to thereby jet a part of the ink temporarily heated by the localized application of thermal energy by a resistor corresponding to an image signal.

EXAMPLE 1

The following example illustrates the first embodiment contructed as described above.

The first plate member 10 was formed of an insulating substrate having a laminated structure composed of a 1 mm thick alumina ceramic plate. An array of electric resistance heaters of tantalum nitride ($Ta_2N$) were formed on the plate, a 2 μm thick insulating/protecting film of $SiO_2$ was formed on the array, and a 1μm thick Cr-Cu-Cr electrostatic induction electrode was formed on the film. A second plate member 12 was formed of a 1 mm thick alumina ceramic plate and was placed opposite the first plate. A gap of 100μm between the first and second plate members was formed by a glass spacer 100 μm thick to form a slit for holding/jetting the ink. Ink-jet side (orifice egress side) end portions 10*a* and 12*a* of the respective plate member 10 and 12 were polished with a 0.3 μm particle diameter diamond slurry. After polishing, a photoresist mask was formed on an area of each of the ink-jet side end portions of the plate members extending from the edge of the slit for about 50 μm. After masking, a silicon fluoride coating agent KE-801 (made by Shinetsu Chemical Industry Co., Ltd.) having a thickness of 1 μm was applied to the entire end surfaces 10*a* and 12*a* of the plate members 10 and 12. The photoresist mask was removed by etching, so that the respective low surface energy treatment areas 24 and 26 extending to within 50 μm of the respective slit edges were completed.

The critical surface tension of the thus treated surface of the plate was 16 dyne/cm and the critical surface tension of the non-treated surface of the plate was 50 dyne/cm, as measured using a plotting method. A printing test was carried out with the recording head constructed as described above using an ink having a surface tension of 32 dyne/cm. As the result, stable and good quality printing could be repeatedly attained when thermal energy of 0.5 W for 0.5 ms and an electric field of $4\times10^6$ V/m were synchronously applied to the ink.

As a comparative example, a recording head was constructed in the manner as described above, except that the low surface energy treatment was not used and a printing test was carrried out. As the result, problems, such as outflow of ink and stains, occurred at the end surface of the recording head when printing was repeated. Accordingly, the printing was unstable in dot size and was not useful Referring to FIG. 2, there is shown a sectional view of a second embodiment of the thermal electrostastic ink-jet recording head of the present invention. Parts substantially the same as those in FIG. 1 are referenced correspondingly.

Figure 2:
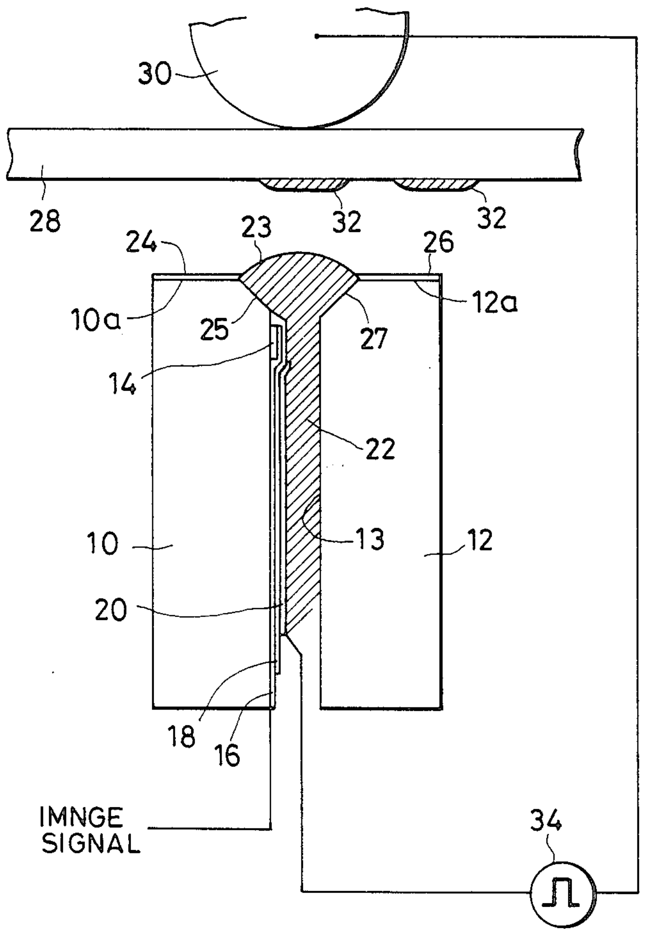
FIG. 2 is a sectional view of another embodiment of the thermal electrostatic ink-jet recording head according to the present invention.

This embodiment differs from the recording head of FIG. 1 in that the inner corner of the plates 10 and 12 forming the ink-jet orifice 13 are beveled, or cut off, at a predetermined angle, to thereby form upper edge portions 25 and 27, respectively, adjacent the slit 13 between the inner walls of the plate members 10 and 12 forming the orifice. The embodiment of FIG. 2 is constructed in the same manner as the embodiment of FIG. 1 except for the above-mentioned difference which is described in more detail.

In this embodiment, the low surface energy treatment is carried out on the entire upper surfaces 10*a* and 12*a* of each of the plate members 10 and 12 defining the ink-jet orifice 13, after which the respective corner portions of the slit edges are beveled, or cut off, to provide surface portions 25 and 27 that are easily wet with ink. This embodiment has the following merits The first merit is that a meniscus having a quantity of ink necessary for printing can be formed stably. This is caused by the physical factors of the difference in ink wetability between the low-surface-energy-treated parts 24 and 26 and the non-treated parts 25 and 27 and the angular form of the respective upper edges 25 and 27 provided by cutting off the slit corner walls. The second merit is in that such a recording head can be produced more easily.

The recording head according to this embodiment is constructed by the following procedure. A heating resistor array, a current conducting electrode, an insulating/protecting layer, and an electrostatic induction electrode layer are successively laminated on a surface of the first plate member 10 formed of an insulating substrate, as previously described. The respective whole upper end surfaces **10*a* and 12*a* of the first and second plate members 10 and 12 are finished by machining, or polishing or the like, after which the low surface energy treatment is applied to produce the films 24 and 26. The low surface energy treatment is attained by applying a silicone-type or fluorocarbon-type low surface energy treating agent to the upper end surfaces or by coating the upper end surfaces with the agent by a plasma CVD method. After the treatment, the upper interior corners of the plates 10 and 12 are ground off to form the surfaces 25 and 27** and to expose the insulating substrate surface.

EXAMPLE 2

The following is a specific example of the second embodiment constructed as described above. A 1 mm thick alumina ceramic substrate was used for the first and second plate members 10 and 12. As low surface energy treatment, the entire upper end surface **10*a* and 12*a* of the plate members 10 and 12** were coated with 1 μm thickness of a silicone hard coating agent, KP-85 (made by Shin-etsu Chemical Industry Co., Ltd.). After coating, the corners of the slit edges were ground by 50 μm at an angle of 45 degrees. Then, the plate members were arranged with a separation of 100 μm through use of a spacer and were joined together with an adhesive agent to form a slit therebetween. Stable printing could be repeatedly attained by use of the thus obtained recording head at a thermal energy of 0.5 W applied for 0.5 ms and an electric field of $4\times10^6$ V/m applied for 0.5 ms to the ink.

In another instance where the surface treating agent was replaced by a silicon fluoride coating agent, KP-180, the effect was substantially equal to that in the case where KP-85 was used. In short, stable and good printing could be repeatedly attained also in this case.

The critical surface tensions of the alumina ceramic, ink, KP-85 treated layer, and KP-8091-treated layer were 50 dyne/cm, 32 dyne/cm, 30 dyne/cm, and 16 dyne/cm, respectively, as measured using a plotting method.

As a comparative example, a recording head was constructed in the manner as described above except that the low surface energy treatment was not used. A printing test was carried out in the same manner. As the result, problems, such as outflow of ink and stains, occurred at the end surface of the recording head when printing was repeated. Accordingly, the printing was unstable in dot size and was not useful.

As a further comparative example, a recording head in which the low surface energy treatment was made but in which the beveling off of the corners at the slit edges was not made, was constructed. A printing test was carried out on the recording head. As the result, the shape of the meniscus varied owing to the dripping of the surface treating agent and the coating irregularity at the upper end portions. Accordingly, the uniformity in the longitudinal direction of the slit was destroyed and, at the same time, the meniscus was short of ink volume. The printing quality of the head according to the comparative example was inferior in printing stability to that of the head according to the second embodiment of the present invention.

Figure 3:
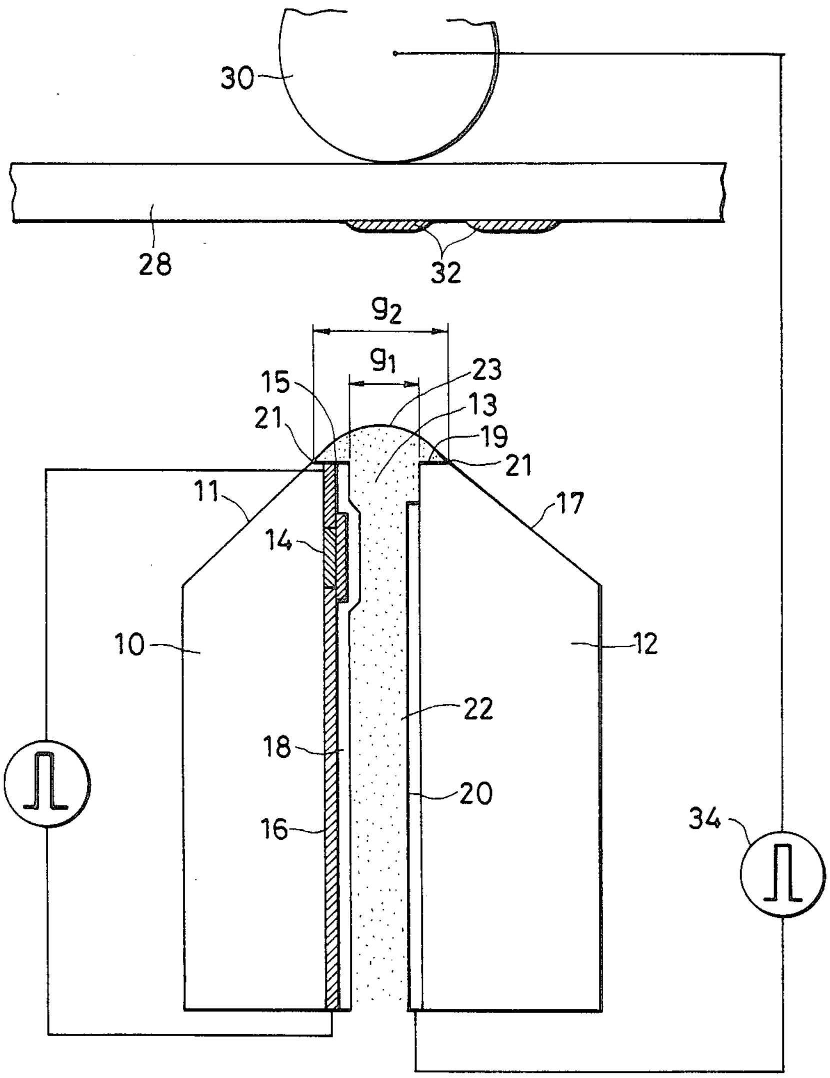
FIG. 3 is a sectional view of a third embodiment of the thermal electrostatic ink-jet recording head according to the invention.

Referring to FIG. 3, there is shown a sectional view of a third embodiment of the thermal electrostatic ink-jet recording head of the present invention. The recording head of FIG. 3 differs from the recording head of FIGS. 1 and 2 in the shape of the head top end portion. In this embodiment, inclined end surface portions 11 and 17 are provided on the first and second plate members 10 and 12, respectively, and taper toward the orifice 13 to form a wedge-shaped top end. The meniscus 23 of the ink is supported by the respective flat upper end surfaces 15 and 19 of the plate members 10 and 12. Low surface energy treatment is applied to the inclined surface portions 11 and 17. Furthermore, the electrically conductive layer 20 constituting an electrostatic induction electrode is provided on the inner wall of the second plate member 12. In other respects, the recording head of this embodiment is the same as in the above-mentioned two embodiments.

It has been confirmed that it is necessary to keep the shape of the meniscus constantly stable by holding ink at the linear portions 21 on the outer sides of the top end portions 15 and 19 of the head while projecting the ink meniscus 23 at the top end portion of the slit 13 for the purpose of jetting ink with stability and good heating efficiency. Furthermore, a small-diameter dot can be jetted by low energy when the top end portions are processed to satisfy the relation $g_2=10g_1$, preferably $g_2=4g_1$, where $g_1$ and $g_2$ (indicated in FIG. 3) respectively, represent the width of the slit 13 and the distance between the outside edges 21 and 21 of the flat upper end surface 15 and 19 of the recording head. In order to keep the shape of the meniscus stable, the edges 21 and 21 disposed at the outsides of the wedge-shaped top end portions of the recording head should be smooth and linear. If cracks or the like exist in the edges, the projected ink could flow out to cause abnormality in jetting.

Precision polishing of the top end portions of the head has been required in the prior art. According to this embodiment, however, it is possible to keep ink at a stable projecting state without precision polishing of the top end portions of the head, because the low surface energy treatment is applied to the inclined portions 11 and 17 adjacent the edge portions 21 and 21 at the top end of the head. Due to this, a small diameter dot can be jetted with stability and good heating efficiency.

The following examples illustrate the third embodiment constructed as described above.

EXAMPLE 3-1

Tantalum nitride was evaporated onto a 1 mm thick alumina substrate by a high-frequency sputtering method to form an electric heating resistor array with a pitch of 125 μm and a width of 100 μm. The resistor was coated with Au as an electrically conducting electrode and further coated with $SiO_2$ as a heatproof protection layer by a high-frequency sputtering method. Another 1 mm thick alumina substrate was prepared and coated with Cr-Cu-Cr for use as an electrically conductive layer. The two substrates were joined together by sintering with a 100 μm alumina material being used as a spacer. Thus, a printing head having a printing portion at the internal wall within a 100 μm wide slit was prepared. The top end portion of the head was rough polished by diamond powder from both sides so as to be wedge-shaped.

The polished surface was dipped into a silicone hard coating agent KP-85 (made by Shin-etsu Chemical Industry Co., Ltd.) to be coated with the agent. After drying at 120° C. for 30 minutes, the coating agent was completely hardened to form a 1.0 μm thick low surface energy film. The critical surface tension of the thus formed low surface energy film was 30 dyne/cm as measured by a plotting method.

The top end portion of the head was polished with diamond powder so as to be planed and to form a flat portion for holding the ink meniscus. Thus, the head was finished. The width of the ink holding portion was 300 μm. Dye-soluble oil ink having a volume resistivity of $10^7$ μcm and a viscosity of 120 cp (20° C.) was injected into the slit of the head. A counter electrode which was connected to a voltage pulse driving circuit was placed 400 μm above the top end portion of the head. A sheet of recording paper was positioned close to the counter electrode. An ink jetting test was carried out with an electric power consumption of 0.5 W per dot. As the result of the test, a good dot with the diameter of 150 μm could be printed in the printing time of 0.4 msec.

As a comparative test, an ink jetting test was carried out in the same manner on a head constucted by the same procedure except that the low surface energy treatment was not made. As a result of the comparative test, an ink dot diameter of about 200 μm could be obtained in the printing time of 1.5 msec but the dot diameter widely varied. Thus, the head which was subject to the low surface energy treatment was far superior to the head not so treated.

EXAMPLE 3-2

In the same manner as in foregoing example, two alumina substrates were independently polished and were subjected to low surface energy treatment after which the two substrates were joined to each other through a spacer with an adhesive agent to thereby prepare a head. After the alumina substrates were joined together, the width of the slit and the displacement between the outside edges of the top end portions of the two substrates were measured. The former was not larger than 5 μm, and the latter was not larger than 20 μm.

An ink dot jetting test was carried out in the same manner on the head. As a result of the test, a good dot with the diameter of 160 μm could be printed in the printing time of 0.5 msec under the condition of electric power consumption 0.5 W per dot.

EXAMPLE 3-3

A wedge-shaped head constructed in the same manner as in Example 3-1 was used in this example. Silicone coating material KP-801 (made by Shin-etsu Chemical Industry Co., Ltd.) was used as a low surface energy treating agent. The head was dipped into the agent to coat the head. After drying at 80° C. for 20 minutes, the coating agent was hardened to prepare a 0.5 μm thick low surface energy film. The critical surface tension of the thus prepared low surface energy film was 16 dyne/cm as determined by a plotting method.

An ink dot jetting test was carried out in the same manner on the head. As the result of the test, a good dot with a diameter of approximately 120 μm could be printed in the printing time of 0.2 msec under the condition of electric power consumption of 0.5 W per dot.

As described above in detail, according to the present invention, a stable ink meniscus having a satisfactory shape can be produced. Accordingly, the recording head of the invention has a meritorious effect that stable and high quality printing can be made with little variations in dot diameter over a long period of time. Furthermore, precise polishing is not required, because the shape of the ink meniscus is maintained by low surface energy treatment. Accordingly, a high performance head can be easily manufactured.

What is claimed is:

1. A thermal electrostatic ink-jet recording head comprising:

(a) two opposing plate members spaced apart at a predetermined distance to provide a slit adapted to contain an ink material therebetween, each of the plate members having an inner wall and an orifice side end portion, the surface of the respective inner walls and end portions defining an ink-jet orifice;

(b) means on one of said inner walls for selectively heating said ink material; and (c) means on one of said inner walls for applying an electrostatic field to said ink material; and (d) means for providing on each of said end portions beyond a predetermined distance from said ink-jet orifice a first area having a lower critical surface tension and a second area thereof within said predetermined distance and adjacent said ink-jet orifice having a higher critical surface tension.

2. The recording head of claim 1, wherein said first area of each of said end portions is coated with a resin.

3. The recording head of claim 2, wherein said resin is selected from the group consisting of fluorocarbon and silicone resins.

4. The recording head of claim 1, wherein said second area is a beveled edge formed on the interior corner of each of said plate members.

5. The recording head of claim 4, wherein said first area is coated with a resin.

6. The recording head of claim 1, wherein said first area is an inclined surface tapering toward said ink-jet orifice and said second area is a flat surface.

7. The recording head of claim 6, wherein said first area has a resin coating.

8. The recording head of claim 6, wherein the ratio of the distance between the outside edges of said flat surface to the width of said ink-jet orifice is=10:1.

9. The recording head of claim 6, wherein the ratio of the distance between the outside edges of said flat surface to the width of said ink-jet orifice is=4:1.

10. The recording head of claim 1, wherein said first area, said second area and said ink material satisfy the relationship $\gamma c_1 < \gamma c_3 < \gamma c_2$, where $\gamma c_1$, $\gamma c_2$ and $\gamma c_3$ represent the critical surface tension of said first area, said second area and said ink material, respectively.

11. The recording head of claim 1, wherein said heating means comprises an array of heating elements adapted to receive electric pulses corresponding to an image signal to selectively heat a portion of said ink material to be jetted.

12. The recording head of claim 11, wherein said means for applying an electrostatic field comprises an electrostatic induction electrode for applying an electrostatic field to the ink material to be jetted.

13. The recording head of claim 12, further including an electrode for supplying said electric pulses and an insulating layer on said electrode for supplying electric pulses, and wherein said electrostatic inductions electrode is positioned on the surface of said insulating layer.

* * * * *